United States Patent [19]

Howe

[11] Patent Number: 4,640,744
[45] Date of Patent: Feb. 3, 1987

[54] AMORPHOUS CARBON ELECTRODES AND THEIR USE IN ELECTROCHEMICAL CELLS

[75] Inventor: Arthur T. Howe, Naperville, Ill.

[73] Assignee: Standard Oil Company (Indiana), Chicago, Ill.

[21] Appl. No.: 573,112

[22] Filed: Jan. 23, 1984

[51] Int. Cl.$^4$ .................... C25B 1/00; C25B 11/12; C25B 9/00; H01M 6/30
[52] U.S. Cl. ...................... 204/1 R; 204/242; 204/290 R; 204/294; 204/60; 429/111
[58] Field of Search ................ 204/242, 290 R, 294, 204/290 F, 1 R, 60; 429/111

[56] References Cited

U.S. PATENT DOCUMENTS

| 2,428,055 | 9/1947 | von Hippel et al. | 204/294 X |
| 3,814,699 | 6/1974 | Baldieri et al. | 204/294 X |
| 3,829,327 | 8/1974 | Omori et al. | 204/294 X |
| 4,206,263 | 6/1980 | Rieger et al. | 204/294 X |
| 4,216,071 | 8/1980 | Gobrecht | 204/242 |

Primary Examiner—Donald R. Valentine
Attorney, Agent, or Firm—Richard A. Kretchmer; William T. McClain; William H. Magidson

[57] ABSTRACT

Amorphous carbon is an electrocatalytically active material which is useful as an electrode component in electrochemical cells.

15 Claims, No Drawings

AMORPHOUS CARBON ELECTRODES AND THEIR USE IN ELECTROCHEMICAL CELLS

BACKGROUND OF THE INVENTION

1. Field of the Invention

This invention relates to an electrocatalytically active electrode material for use in electrochemical cells. More particularly, the invention relates to the use of amorphous carbon as an electrode material in electrochemical cells.

2. Description of the Prior Art

In the form of graphite, carbon has been extensively utilized in the fabrication of electrodes for use in electrochemical cells. Indeed, the two most generally satisfactory electrode materials are graphite and platinum. Among their various properties, both graphite and platinum are excellent electrochemical catalysts. Platinum is typically the electrode material of choice for laboratory applications whereas graphite is utilized for industrial applications because of its low cost relative to platinum.

Carbon films have been produced by a variety of vacuum deposition techniques which include electron beam vacuum evaporation, radio frequency sputtering, radio-frequency plasma decomposition of hydrocarbon gases, direct current glow discharge of predominantly hydrocarbon gases with a small fraction of argon, coaxial pulsed plasma acceleration using methane gas, vacuum arc deposition using a graphite cathode, ion beam deposition with argon and hydrocarbon scission fragment ions, and deposition using pure carbon ion beams. Typically, however, sputtering, electron beam evaporation and plasma deposition are the most convenient techniques for the preparation of these films. When produced by decomposition of a hydrocarbon gas, the carbon films may contain small amounts of hydrogen.

The above-described carbon films are very hard and typically have a Mohs hardness of about 6. In addition, the films are generally substantially transparent to visible and infrared light, are essentially inert chemically, and have a resistivity which can range from about 0.1 to greater than $10^{11}$ ohm-centimeter depending on the precise method of manufacture. The carbon in these films is nongraphitic in character and has been described in the scientific literature as diamond-like or amorphous. For the purposes of this application, all substantially nongraphitic carbon which is produced by vacuum deposition techniques is hereinafter referred to as amorphous carbon.

Various studies which have utilized techniques such as X-ray diffraction, electron microscopy and electron diffraction have demonstrated that the carbon which is produced by vacuum deposition techniques is essentially amorphous in character. Unlike graphitic carbon, which is an excellent conductor of electricity, amorphous carbon is a semiconductor with a relatively high resistivity which decreases with increasing temperature. Finally, amorphous carbon is essentially transparent to visible and infrared light whereas graphitic carbon is not. These properties suggest that the carbon atoms in amorphous carbon are four-coordinate as in diamond rather than three-coordinate as in graphite. However, there is no suggestion in the prior art that either diamond or amorphous carbon would have electrocatalytic properties.

An electrochemical cell, in its most simple form, comprises an electrolyte which is in contact with two or more electrodes. Photoelectrochemical cells represent a special class of electrochemical cells wherein at least one of the electrodes is photoactive.

Photoelectrochemical cells are capable of generating electrical energy from solar radiation and also provide a means for the storage of solar energy. The basic photoelectrochemical cell comprises a photoelectrode, a counterelectrode and a reduction-oxidation or redox couple in an electrolyte. The simplest photoelectrode in the basic cell comprises a semiconductor with the front face illuminated by solar radiation and in direct contact with electrolyte solution which contains the redox couple. The back face of the semiconductor is connected to an insulated wire, and a voltage is generated between the back face contact and the counterelectrode with electrons traveling in an external circuit formed by the wires between the two electrodes; and ions pass through the electrolyte between the two electrodes, completing the electrical circuit. The junction between the electrolyte and the semiconductor photoelectrode is a diode junction which acts much the same as a p-n junction in a solid state solar cell. However, since the junction between the electrolyte and the semiconductor is a property of the interface, its formation does not require the precise diffusion of dopant material into the semiconductor which is usually important in a solid state device. Therefore, the photoelectrochemical cell has substantial differences from conventional solid state photovoltaic cells. These differences lead to important advantages over conventional solid state photovoltaic cells, such as the ability to use a broader range of materials for efficient cell operation, the ability to avoid the constraints of lattice parameter matching between adjacent material layers, which is necessary for nearly all solid state photovoltaic devices, and the ability to use small grain size semiconductor material without any substantive decrease in solar conversion efficiency.

The potential advantages of the photoelectrochemical cell offer the promise of a relatively low cost method for the production and storage of useful energy from solar radiation. Unfortunately, this promise has not yet been fully realized. A major problem with photoelectrochemical cells has been the fact that such cells typically have an extremely short lifetime as a consequence of unwanted corrosion effects which occur at the junction between the photoelectrode and the electrolyte solution.

A number of publications have disclosed various attempts to prevent corrosion of the semiconductor photoelectrode in a photoelectrochemical cell. One approach has been to utilize thin protective metal films, particularly gold and platinum, over the base semiconductor [see T. Skotheim, I. Lundstrom, and J. Prejza, *J. Elec. Soc.: Accel. Comm.*, 1625 (1981)]; however, the films must be thin in order to permit light to pass through to the semiconductor, and it is difficult to produce uniform, impermeable, thin metal layers and corrosion still occurs.

A second approach to stabilize the photoelectrode involves the use of an ultra-thin layer of a wide band gap oxide, typically $TiO_2$ or $SnO_2$, over the base semiconductor (see A. J. Nozik, *Second International Conference on Photovoltaic Conversion and Storage of Solar Energy*, Aug. 8, 1978, Cambridge, England). Films such as $TiO_2$ are transparent but are also insulating in character and, if deposited with thickness sufficient to protect against corrosion, the photogenerated charge carriers cannot penetrate the insulating layer and thus the insulator layer prevents operation of the cell. SnO$_2$ layers are also transparent to light, are more corrosion resistant than TiO$_2$, and can be made conductive by doping. However, SnO$_2$ has virtually no electrocatalytic activity (the ability to enhance the kinetic exchange between electrons in the conducting layer and the redox reaction in the electrolyte solution). Electrocatalytic activity is quite important in driving the desired redox-couple reaction in the electrolyte. Therefore, unless an electrocatalytically active layer is deposited on the SnO$_2$ layer, a photoelectrochemical cell, which uses SnO$_2$ alone as a corrosion protective layer, has an extremely low cell output.

A third approach to prevent photoelectrode corrosion involves coating the base semiconductor with an organic conductor layer [see R. Noufi, O. Tench, and L. F. Warren, *J. Elec. Soc.*, 127, 2310 (1980)]. However, severe problems are encountered in aqueous electrolyte solutions with the organic layers showing poor adhesion and, at best, providing protection for only a few days.

A fourth corrosion protection scheme involves the formation of derivative layers over the base semiconductor which are covalently bonded with the surface layer of the base semiconductor, but photoelectrode stability is maintained for only several days [see J. M. Bolts, A. B. Bocarsky, N. C. Palazzotto, E. J. Walton, N. S. Louis, and N. S. Wrighton, *J. Am. Chem. Soc.*, 101, 1378 (1979)].

The prior art fails to disclose a photoelectrode which is stable for an extended period of time and which produces a high cell output with good efficiency. Accordingly, there is a need for an improved corrosion resistant photoelectrode which has a long lifetime and shows improved photocell output and efficiency in the conversion of electromagnetic radiation to electrical power.

Silicon solar cells having an antireflecting coating of amorphous carbon have been described by Moravec et al., *J. Vac. Sci. Technol.*, 20(3), 1982, pp. 338-340. In addition, B. A. Banks et al. have disclosed the preparation of amorphous carbon films on fused silica, copper and tantalum substrates by sputter techniques using an argon ion beam (NASA Technical Memorandum 82873, prepared for the Meeting of the Greater New York Chapter of the American Vacuum Society, Yorktown Heights, N.Y. June 2, 1982). Further, the use of amorphous carbon for wear-resistant coatings, protective coatings, and antireflective coatings has been disclosed by H. Vora et al., *J. Appl. Phys.*, 52(10), October 1981, pp. 6151-6157. However, the prior art fails to either teach or suggest the use of the amorphous carbon as an electrode material in an electrochemical cell.

SUMMARY OF THE INVENTION

The present invention is directed to the discovery that amorphous carbon is an electrocatalytic material which can be utilized in the fabrication of highly effective electrodes for use in electrochemical cells.

One embodiment of the invention is an electrochemical cell comprising at least two electrodes in physical contact with an electrolyte wherein at least one of said electrodes is comprised of amorphous carbon.

Another embodiment of the invention is a photoelectrochemical cell comprising: (a) a photoelectrode which comprises a semiconductor substrate wherein said photoelectrode has a surface coating of amorphous carbon, (b) a counterelectrode, and (c) a liquid electrolyte in physical contact with said photoelectrode and counterelectrode.

A further embodiment of the invention is a method for carrying out an electrochemical reaction which comprises effecting said electrochemical reaction at an electrode which is comprised of amorphous carbon.

An object of the invention is to provide a new electrode material.

Another object of the invention is to provide a carbon electrode material having physical properties which are superior to those of graphite.

Another object of the invention is to provide a new electrochemical catalyst.

A further object of this invention is to provide a transparent, chemically inert, and electrically conductive surface coating for photoelectrodes.

A still further object of this invention is to provide a substitute for the thin films of platinum which have previously been employed in the fabrication of electrodes and electrochemical sensors.

DETAILED DESCRIPTION OF THE INVENTION

It has been found that amorphous carbon is a highly effective electrochemical catalyst for many reduction-oxidation reactions. In view of this electrocatalytic activity, amorphous carbon has been found to be useful as an electrode material in electrochemical cells. In further view of the substantial transparency of amorphous carbon to visible and infrared light, its chemical inertness, and the ease with which films of this material can be produced, amorphous carbon is particularly useful as a substitute for the platinum films which have previously been utilized in the fabrication of electrodes for use in photoelectrochemical cells and electrodes which are used as sensors for the monitoring and determination of solution species.

Amorphous carbon can be used in any form in the practice of this invention. For example, the amorphous carbon can be used as a film, a powder, or can also be fabricated into pastes, compacts or shaped electrodes such as rods or bars. It will be appreciated, of course, that the amorphous carbon can be combined with any desired additives, such as adhesives.

The resistivity of the amorphous carbon can be controlled over the range from about 0.1 to greater than about $10^{11}$ ohm-centimeter by manipulation of the following factors: (1) deposition rate, (2) substrate temperature during deposition, (3) postdeposition annealing, and (4) method of deposition. For example, the higher the deposition temperature or the annealing temperature, the lower the resistivity. The most important control factor is the method of deposition. Plasma deposition techniques result in an amorphous carbon which contains small amounts of hydrogen and has a high resistivity. Sputtering and electron beam evaporation techniques can be utilized to deposit an amorphous carbon which contains essentially no hydrogen and has a low resistivity. It will be appreciated, of course, that the amorphous carbon of this invention can contain small amounts of hydrogen.

In view of the ease with which films of amorphous carbon can be prepared by vacuum deposition, a highly preferred embodiment of the invention involves the use of a composite electrode wherein the amorphous carbon is utilized as a film which has been deposited on a substrate which may be either an electrically conducting material or an insulating material. Suitable substrates include, but are not limited to, insulators such as glass, ceramics and plastics; and conductors such as metals and semiconductors.

Metals represent a preferred substrate for an amorphous carbon film in the practice of this invention since the metal serves to provide the electrode with mechanical strength and also provides a convenient electrical contact. Suitable metals for this purpose include, but are not limited to, iron and its various alloys, titanium, nickel, silver, lead, vanadium, chromium, molybdenum, manganese, copper, and zinc. Preferred metallic substrates comprise at least one metal selected from the group consisting of iron, titanium, nickel, vanadium, chromium, manganese, and copper. Iron and its various alloys, such as stainless steel, are particularly preferred substrates.

Semiconductors represent another type of preferred substrate for an amorphous carbon film in the practice of this invention. Suitable semiconductors include, but are not limited to, silicon, GaAs, Ge, $B_4C$, InP, AlSb, InSe, ZnSe, $Ca_2Si$, $Ca_2Sn$, GaSb, GaP, CdSe, CdTe, $Cu_2O$, $CuInS_2$, $CdSnP_2$, $CuAlSe_2$, $CdSnAs_2$, and organic semiconductors such as copper phthalocyanine. Silicon, in either single crystal, polycrystalline or amorphous form, is frequently a preferred semiconductor substrate because of its availability and low cost.

When a film or surface coating of amorphous carbon is deposited on a substrate for use in the practice of this invention, the film can be of any desired thickness. However, a thickness in the range from about 10 to about 10,000 Angstrom units is preferred since films of this thickness are conveniently prepared by vapor deposition techniques, and thicker films are usually unnecessary for most electrode applications.

In a typical photoelectrode, the surface which collects light is also the same surface which interacts with the redox couple in the electroylte. Any layer of material at this surface of the photoelectrode should have sufficient electrical conductivity to enable photoinduced charge carriers to traverse the layer without any significant resistance. In addition, any such surface layer should provide corrosion protection and possess adequate electrocatalytic properties to effect the reduction-oxidation reactions in the electrolyte at an adequate rate. Further, such a surface layer should be transparent enough to allow passage of a sufficient amount of light to permit efficient operation of the photoelectrochemical cell. Amorphous carbon has been found to satisfy all of these requirements and, accordingly, a preferred embodiment of this invention involves the use of amorphous carbon as the surface layer of such a photoelectrode.

In a less typical type of photoelectrode, such as a back-illuminated electrode, the surface which collects light is not the same surface which interacts with the redox couple in the electrolyte. In this situation, the optical properties of a surface layer at the electrode surface which interacts with the redox couple are irrelevant. Nevertheless, amorphous carbon is also a highly satisfactory coating material for this type of photoelectrode surface. Indeed, because of its unusual combination of chemical and physical properties, amorphous carbon is an excellent surface coating for all types of photoelectrodes.

When used as a light-transmitting surface layer on a photoelectrode, the amorphous carbon coating can be used in any thickness which permits the passage of substantial amounts of light. However, in view of the substantial transparency of amorphous carbon, this layer can be of essentially any desired thickness which is consistent with satisfactory electron transport across the layer. A thickness in the range from about 10 to about 500 Angstrom units is generally preferred for such a light-transmitting layer since a film of this thickness is usually adequate to provide the photoelectrode with adequate corrosion resistance and electrocatalytic activity.

Any conventional semiconductor can be used in the fabrication of a photoelectrode in accordance with this invention. For example, all of the semiconductors identified above as suitable for use as a substrate for an amorphous carbon film can be employed for this purpose. However, silicon is a highly preferred material because of its availability and low cost.

A particularly preferred photoelectrode for use in the practice of this invention has a multilayer structure and comprises a layer of one or more insulator materials which separates and is in physical contact with the semiconductor substrate and a surface coating of amorphous carbon. The insulator material in this type of photoelectrode has a thickness which is effective to permit electron tunneling between the semiconductor substrate and the amorphous carbon coating. Typically, this layer of insulator material will have a thickness in the range from about 10 to about 25 Angstrom units.

Although the invention is not to be so limited, it is believed that the insulator layer functions in the following manner in a photoelectrode wherein the surface which collects light has a surface coating of amorphous carbon which is separated from the semiconductor substrate by an insulator layer. When used with an n-type semiconductor substrate, the insulator layer serves to permit the passage of electrons from the illuminated face of the photoelectrode to an ohmic contact on the opposite face of the semiconductor substrate but reduces the reverse dark current flow of electrons. Typically, an insulator layer having a thickness of about 5 to about 25 Angstrom units will permit tunneling of electrons from the illuminated amorphous carbon surface across the insulator layer and into the valence band of the semiconductor substrate wherein states have been left empty by the photoexcitation of electrons to the conduction band. The reverse dark current flow of electrons from the conduction band of the semiconductor substrate into the amorphous carbon surface layer is reduced because electrons in the n-type semiconductor substrate are displaced from the insulator-semiconductor interface by the thickness of the charge depletion layer, typically hundreds of Angstrom units. Consequently, in order for unwanted dark current or reverse current flow to occur, electrons must tunnel through both the charge depletion layer and the insulator layer. Since tunneling probability diminishes rapidly with tunneling distance, the insulator layer serves to reduce the reverse current flow, and this has the effect of increasing both the observed cell voltage and current.

When used with a p-type semiconductor substrate, the insulator layer is believed to function in essentially the same manner. However, in this situation, the insulator layer permits the passage of electrons from an ohmic contact on one face of the photoelectrode to the illuminated face of the photoelectrode which interacts with the redox couple in the electrolyte. The undesired reverse dark current flow of electrons is reduced by the insulator layer for the same reasons which are set forth above for the n-type semiconductor substrate.

Suitable insulator materials include all materials which, upon being interposed between the semiconductor substrate and the amorphous carbon surface layer, have a band gap which encompasses the energy window through which the reverse dark current flows. Typical examples include metal oxides such as $Al_2O_3$, $SiO_2$, $MgO$, $MgAl_2O_4$, $Ta_2O_5$, $B_2O_3$, $ZrO_2$, $TiO_2$, $Y_2O_3$, $CeO_2$ and $La_2O_3$; nitrides such as $Si_3N_4$ and $BN$; carbides such as $SiC$; and halides such as $NaF$ or $PbCl_2$. All of the above may be either undoped, or doped, so as to function as desired. Also included are selectively matched semiconductors with suitable widths for the band gap and even appropriate degenerately doped semiconductors, which include n+ with a p-type base semiconductor and p+ with an n-type semiconductor. Also these conditions can be met for n+ with n-type and p+ with p-type, provided the degenerate electronic states or the bands are not in the energy window of the reverse dark currents. Certain appropriate narrow band metallic materials, such as MnP, also fulfill the above requirement, i.e., the partly filled bands are narrow enough such that there is a band gap of sufficient width to encompass the dark current energy window (see J. B. Goodenough, D. H. Ridgley, and W. Newman, *Proc. Int'l. Conf. Magnetism*, Nottingham, Int. Phys. and Phys. Soc., 1964). Also included are insulating organic materials such as polyethylene.

The insulator layer preferably also exhibits electronic and structural properties such that the number of detrimental interfacial electronic states at the base semiconductor/insulator junction is diminished by the presence of the insulator layer. In the case of non-native oxides, several atomic layers of native oxide may also exist between the base semiconductor and the non-native insulator so as to reduce the surface state density and also assist in lattice matching of adjacent layers. One embodiment of the invention involves the use of an insulator layer which comprises a major portion of an insulator other than an oxide of the base semiconductor and a minor portion of an oxide of the base semiconductor.

This invention can be practiced with any electrolyte which is not corrosive with respect to amorphous carbon. However, in view of the fact that amorphous carbon is essentially inert, there are very few, if any, electrolytes which are not compatible with this material.

The electrolyte must contain a redox couple and is preferably liquid, although solid electrolytes can also be employed. Typically, the electrolyte will contain a liquid solvent system which can be either aqueous or nonaqueous in character. Suitable organic solvents include, but are not limited to, trialkyl borates, boronic acid esters, borinic acid esters, tetraalkyl silicates, alkylalkoxyl silanes, alcohols, carboxylic acids, nitroalkanes, alkylnitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites, and sulfones. Specific examples include triethyl borate, diethylmethylboronate, methyl diethylborinate, tetramethyl silicate, trimethoxymethylsilane, ethanol, acetic acid, nitroethane, acetonitrile, dimethylformamide, 1-methyl-2-pyrrolidinone, tetramethyl urea, 1,1-diethoxyethane, 2,2-dimethyoxypropane, ethyl acetate, trimethyl orthoformate, γ-butyrolactone, dimethyl carbonate, ethylene carbonate, tetramethyl orthocarbonate, diethyl ether, tetrahydrofuran, ethylene glycol, dimethyl ether, acetic anhydride, dimethyl sulfate, dimethyl sulfite, ethylene sulfite, and tetramethylene sulfone. Suitable inorganic solvents include, but are not limited to, water, molten salts, liquid ammonia, sulfur dioxide, phosphorus oxychloride, thionyl chloride and sulfuryl chloride. It will be appreciated, of course, that mixtures of various solvents can also be used.

In the case of a photoelectrochemical cell in accordance with this invention, the electrolyte is preferably aqueous but other electrolytes which conduct ionic currents and contain a redox potential appropriately matched to the band structure of the multilayer photoelectrode are also suitable. Nonaqueous electrolytes which are suitable include polar solvents, such as ethanol and methanol, having appropriate ionic conductors in the solvent. In the typical configuration for a photoelectrochemical cell wherein light passes through the electrolyte to the photoelectrode, the electrolyte also is preferably substantially transparent. In an aqueous electrolyte, preferred redox couples are $I_3^-/I^-$, $Br_3^-/Br^-$ and $Fe(CN)_6^{-4}/Fe(CN)_6^{-3}$ with the work function of the base semiconductor matched with the redox potential of the redox couple. Another suitable electrolyte is a mixture of fused salts, such as aluminum chloride with n-butyl pyridinium chloride, wherein the preferred redox couple is iron dicyclopentadienyl/iron dicyclopentadienyl chloride. An example of a substantially organic electrolyte is acetonitrile with $I_3^-/I^-$ as the redox couple. In a particular type of photoelectrochemical cell one or all of the redox components can be gaseous, rather than liquid, as, for example, in a photoelectrolysis cell.

An electrochemical cell in accordance with this invention will, of course, contain at least two electrodes. The most simple type of cell will involve the use of only two electrodes. However, multiple electrodes can also be used and, for example, can be connected either in series or in parallel.

The following examples are intended only to illustrate the invention and are not to be construed as imposing limitations on it.

EXAMPLE I

A. Semiconductor Substrate

The unpolished face of a 1.5 inch diameter wafer of n-type, phosphorus-doped, single-crystal silicon having a (100) orientation and a resistivity of 0.1 ohm-centimeter (obtained from Atomergic Chemicals Corporation) was etched twice for a period of two minutes each time with an aqueous solution of hydrogen fluoride and ammomium fluoride (2.9 molar in hydrogen fluoride and 9.7 molar in ammonium fluoride). Immediately after etching, the crystal was washed for four minutes in triple distilled water and dried under ambient conditions with a flowing nitrogen gas stream from a Simco electrostatic eliminator gun to prevent charge buildup and dust attraction.

B. Attachment of Ohmic Contact to Semiconductor Substrate

A platinum slug, a titanium slug, and a vanadium phosphide pellet were placed in separate carbon crucibles, and all three of the crucibles were placed in a Balzers electron beam evaporator. The silicon wafer was then placed in a substrate holder in the evaporator in such a manner that the etched surface of the wafer was exposed to the operation of the evaporator. The evaporator vessel was pumped down to a pressure of $10^{-5}$ millibar, and materials from the crucibles were deposited on the silicon wafer by electron beam evaporation in the following order: vanadium phosphide (about 150 Angstrom units thick), titanium (about 1,000 Angstrom units thick), and platinum (about 500 Angstrom units thick). The thickness of each of these layers was measured with a calibrated vibrating quartz crystal monitor. After the depositions were completed, the wafer was heated at a temperature of 550° C. for 1.5 hours by a resistive heater at a pressure of $10^{-5}$ millibar and then allowed to cool to room temperature.

C. Deposition of Amorphous Carbon Coating on the Semiconductor Substrate

The resulting wafer was removed from the evaporator, and the polished face (the surface opposite to that carrying the ohmic contact) was cleaned with a cotton swab moistened with triple distilled water using a gentle rolling stroke of the swab. After rinsing with triple distilled water for 15 seconds, this surface was etched for two minutes with an aqueous solution of hydrogen fluoride and ammomium fluoride (2.9 molar in hydrogen fluoride and 9.7 molar in ammonium fluoride). The etching solution was removed, and fresh etching solution was applied for an additional two minutes. The wafer was then washed for five minutes with flowing triple distilled water and dried. The wafer was then promptly placed in an argon gas sputterer (Materials Research Corporation, Model 8667-2 AB) in such a manner that the etched surface was exposed to the action of the sputterer. The sputterer was pumped down to a pressure of $8.5 \times 10^{-8}$ millibar. Argon gas was then admitted in an amount which was effective to increase the pressure to $1.3 \times 10^{-3}$ millibar, and the wafer was heated at a temperature of 300° C. for 20 minutes. Immediately after this heating, a layer of amorphous carbon (504 Angstrom units thick) was deposited by sputtering at one kilowatt and 575 volts under a $1.3 \times 10^{-3}$ millibar argon pressure at a rate of 5.5 Angstrom units per second. The wafer was then allowed to cool to room temperature at a pressure of $1.1 \times 10^{-7}$ millibar.

D. Fabrication of an Electrode from the Wafer

The resulting wafer was cut into chips which were one centimeter square. This cutting procedure served to remove the edge material from the wafer which, otherwise, could cause a short circuit between the front and back surfaces. A 28 gauge silver-coated copper wire was then attached to the ohmic contact surface (back face) of one of the chips with high purity silver paste. The resulting chip was placed on a glass slide with the ohmic contact surface (back face) next to the glass slide, and was sealed to the glass slide with Dow Corning 100 percent black silicone rubber. The edges of the chip were also covered with the silicone rubber in order to prevent any electrolyte penetration.

EXAMPLE II

An electrode was prepared as described in Example I except that only half of a 1.5 inch diameter silicon wafer was used, and the amorphous carbon film was deposited by electron beam evaporation rather than by sputtering. The deposition of amorphous carbon by electron beam evaporation was carried out by placing the half-wafer in a Balzers electron beam evaporator in such a manner that the etched silicon surface was exposed to the operation of the evaporator. After the evaporator vessel was pumped down to a pressure of $7 \times 10^{-6}$ millibar, the half-wafer was heated to a temperature of 300° C., and a layer of amorphous carbon (500 Angstrom units thick) was deposited by electron beam evaporation from carbon rods (Ultra Carbon, ultra F purity) at a rate of 0.5 Angstrom unit per second.

EXAMPLE III

An electrode was prepared as described in Example II except that the amorphous carbon film was deposited at a deposition temperature of 200° C. rather than 300° C.

EXAMPLE IV

An electrode was prepared as described in Example II except that the amorphous carbon film was deposited at a deposition temperature of 100° C. rather than 300° C.

EXAMPLE V

An electrode was prepared as described in Example IV except that a layer of aluminum oxide was placed between the silicon surface and the amorphous carbon coating by the following procedure. The half-wafer with the ohmic contact already attached to the back face was placed in the Balzers electron beam evaporator in such a manner that the etched front silicon face of the half-wafer was exposed to the action of the evaporator, and the evaporator vessel was pumped down to a pressure of $2 \times 10^{-6}$ millibar. The half-wafer was then heated at about 100° C. for one minute. After cooling to about 45° C., a layer of aluminum oxide (10 Angstrom units thick) was deposited by electron beam evaporation of aluminum oxide (Johnson Matthey, puratronic grade) at a rate of about 1 Angstrom unit per second. Immediately thereafter, a film of amorphous carbon (20 Angstrom units thick) was laid down on top of the aluminum oxide layer at a deposition temperature of 100° C. by electron beam evaporation from carbon rods (Ultra Carbon, ultra F purity) at a rate of about 0.8 Angstrom unit per second. The half-wafer was then allowed to cool, and, while cooling, argon was vented into the evaporator vessel until the pressure increased to about 20 millibars. The pressure in the vessel was then reduced to $4 \times 10^{-6}$ millibar, and argon was again vented into the vessel until the pressure increased to about 20 millibars. The pressure in the vessel was again reduced to $4 \times 10^{-6}$ millibar, and the half-wafer was then heated at about 700° C. for three minutes. The half-wafer was allowed to cool and was then used to fabricate an electrode as previously described.

EXAMPLE VI

The electrocatalytic properties of the electrodes prepared in Examples I and IV were evaluated in an electrochemical cell which comprised a test electrode, a platinum counterelectrode, and an electrolyte which was an aqueous solution of $I_2$ and HI (0.28 molar in $I_2$ and 1.0 molar in HI). When a voltage was applied between the test electrode and the platinum counterelectrode, a substantially linear current-voltage relationship was observed for each test electrode in both an anodic and cathodic direction (about 0.1 volt in either direction) about the zero current point. This substantially linear current-voltage relationship serves to demonstrate the electrocatalytic activity of the test electrodes.

In each case, a total cell resistance was measured and extrapolated to an electrode surface area of one square centimeter. In addition, the limiting current at high voltages was also measured. Comparison measurements were also carried out in an identical electrochemical cell except that platinum and silicon test electrodes were used. The results are set forth in Table I.

TABLE I

| Test Electrode | Total Cell Resistance,[a] Ohm | Limiting Current, mA/cm$^2$ |
|---|---|---|
| Platinum | 0.8 | 160 |
| Example I | 2.2 | 110 |
| Example IV | 5.9 | 95 |
| Silicon | 1,200 | 0.3 |

[a]Extrapolated to an electrode surface area of one square centimeter.

The results which are set forth in Table I demonstrate that an uncoated silicon electrode has essentially no electrocatalytic activity since it affords a negligible limiting current and results in an extremely large total cell resistance. In contrast, the electrodes which have a surface layer of amorphous carbon afford a total cell resistance and a limiting current which are slightly less favorable but of comparable magnitude to those obtained with a platinum electrode. Consequently, the amorphous carbon coated electrodes of Examples I and IV have an electrocatalytic activity which is slightly less but of comparable magnitude to that of platinum.

EXAMPLE VII

The electrodes prepared in Examples I, III, and IV were subjected to lifetime tests in order to evaluate the degree of corrosion protection provided by the surface layer of amorphous carbon. These tests were carried out using an electrochemical cell which consisted of a test electrode, a platinum counterelectrode and an electrolyte which contained either a $I_3^-/I^-$ or a $Br_3^-/Br^-$ redox couple, with a voltage of 0.19 volt applied between the two electrodes to render the test electrode either an anode or a cathode. The $I_3^-/I^-$ electrolyte was an aqueous solution of $I_2$ and HI (0.28 molar in $I_2$ and 1.0 molar in HI). The $Br_3^-/Br^-$ electrolyte was an aqueous solution of $Br_2$ and HBr (4.9 molar in HBr and 0.35 molar in $Br_2$). The results are set forth in Table II. The initial current density was also measured in each of these experiments and is set forth in Table II. These results demonstrate that the amorphous carbon surface coating can provide corrosion protection with respect to either the $I_3^-/I^-$ or the $Br_3^-/Br^-$ electrolyte for about three months or more. In contrast, an unprotected silicon electrode has a lifetime of a few minutes when exposed to either of these electrolytes.

TABLE II

| Test Electrode | Polarity | Electrolyte | Initial Current Density, mA/cm$^2$ | Lifetime, Days |
|---|---|---|---|---|
| Example I | + | $I_3^-/I^-$ | 2.6 | 76 |
| Example III | − | $I_3^-/I^-$ | 14 | >96 |
| Example IV | − | $I_3^-/I^-$ | 14 | 14 |
| Example IV | + | $I_3^-/I^-$ | 1.0 | >76 |
| Example III | − | $Br_3^-/Br^-$ | 6 | >6 |
| Example III | + | $Br_3^-/Br^-$ | 3 | >80 |
| Silicon | − | $I_3^-/I^-$ | — | ca. 0.300 |

EXAMPLE VIII

The electrode prepared in Example V was evaluated as a photoelectrode in an electrochemical cell which contained a platinum counterelectrode and an electrolyte which contained a $Br_3^-/Br^-$ redox couple. The electrolyte was an aqueous solution of hydrogen bromide and bromine (9.4 molar in hydrogen bromide and 0.17 molar in bromine). The electrolyte in the beaker was mechanically stirred, and the photoelectrode was positioned in the electrolyte at a distance of about one millimeter from the quartz window through which the light was passed. At one sun illumination, the cell was found to produce a short circuit current of 26.7 milliamperes per square centimeter and an open circuit voltage of 0.49 volt. In addition, the efficiency was 7.5 percent and the fill factor was 0.53.

I claim:

1. An electrochemical cell comprising at least two electrodes in physical contact with an electrolyte wherein at least one of said electrodes comprises an electrically conducting substrate having a surface coating of amorphous carbon.

2. An electrochemical cell as set forth in claim 1 wherein said surface coating of amorphous carbon has a thickness in the range from about 10 to about 10,000 Angstrom units.

3. An electrochemical cell as set forth in claim 1 wherein said electrically conducting substrate is a metal.

4. An electrochemical cell as set forth in claim 3 wherein said electrically conducting substrate comprises at least one metal selected from the group consisting of iron, titanium, nickel, vanadium, chromium, manganese and copper.

5. An electrochemical cell as set forth in claim 1 wherein said electrically conducting substrate is a semiconductor.

6. A photoelectrochemical cell comprising:
   (a) a photoelectrode which comprises a semiconductor substrate wherein said photoelectrode has a surface coating of amorphous carbon,
   (b) a counterelectrode, and
   (c) a liquid electrolyte in physical contact with said photoelectrode and counterelectrode.

7. A photoelectrochemical cell as set forth in claim 6 wherein said surface coating of amorphous carbon has a thickness in the range from about 10 to about 500 Angstrom units.

8. A photoelectrochemical cell as set forth in claim 6 wherein said semiconductor substrate is silicon.

9. A photoelectrochemical cell as set forth in claim 6 wherein said photoelectrode comprises a layer of insulator material which separates and is in physical contact with said semiconductor substrate and said surface coating of amorphous carbon, and wherein said insulator material has a thickness which is effective to permit electron tunneling between said semiconductor substrate and said amorphous carbon coating.

10. A photoelectrochemical cell as set forth in claim 9 wherein said layer of insulator material has a thickness in the range from about 5 to about 25 Angstrom units.

11. A method for carrying out an electrochemical reaction which comprises effecting said electrochemical reaction at an electrode which comprises an electrically conducting substrate having a surface coating of amorphous carbon.

12. A method as set forth in claim 11 wherein said surface coating of amorphous carbon has a thickness in the range from about 10 to about 10,000 Angstrom units.

13. The method as set forth in claim 11 wherein said electrically conducting substrate is a metal.

14. The method as set forth in claim 13 wherein said electrically conducting substrate comprises at least one metal selected from the group consisting of iron, titanium, nickel, vanadium, chromium, manganese, and copper.

15. The method as set forth in claim 11 wherein said electrically conducting substrate is a semiconductor.

* * * * *